Oct. 14, 1969  W. P. SIEGMUND  3,472,718

METHODS OF MAKING DISPLAY DEVICES

Original Filed Sept. 19, 1960  2 Sheets-Sheet 1

INVENTOR.
WALTER P. SIEGMUND
BY James P. McAndrew
ATTORNEY

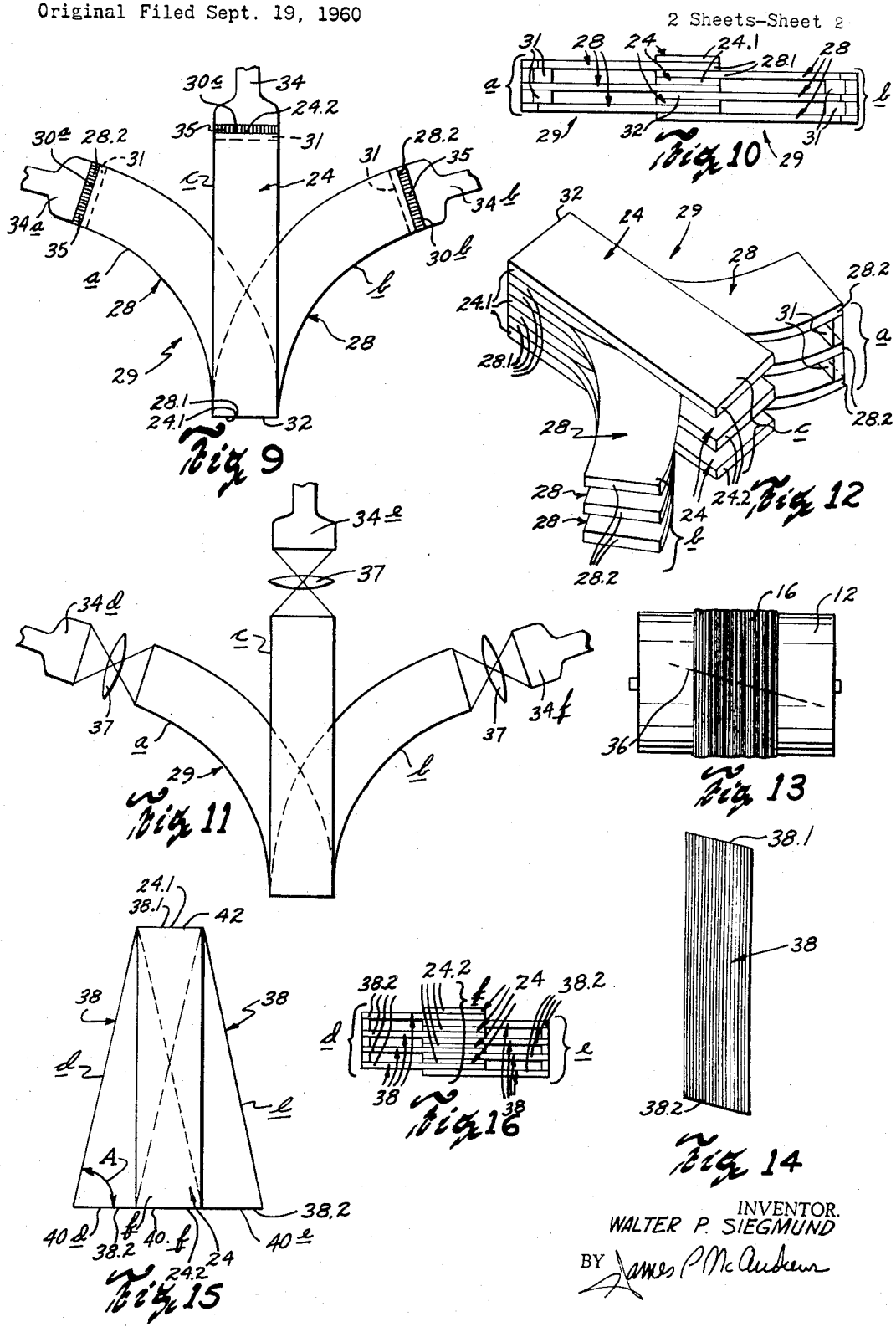

United States Patent Office 3,472,718
Patented Oct. 14, 1969

3,472,718
METHODS OF MAKING DISPLAY DEVICES
Walter P. Siegmund, Woodstock, Conn., assignor, by mesne assignments, to American Optical Corporation, a corporation of Delaware
Original application Sept. 19, 1960, Ser. No. 57,045, now Patent No. 3,247,755, dated Apr. 26, 1966. Divided and this application Dec. 20, 1965, Ser. No. 527,629
Int. Cl. B65h 81/00; B32b 31/00
U.S. Cl. 156—174                3 Claims

ABSTRACT OF THE DISCLOSURE

A method of making an image-transmitting device is provided. The method includes the steps of winding a plurality of light-transmitting fibers in the form of helices, some of which taper from end to end. The helices which taper from end to end are cut transversely of the helix convolutions so as to form a flat curved fiber ribbon. Other straight fiber ribbons are formed by cutting untapered helices transversely to the helix convolutions. The resulting straight and curved ribbons are arranged in groups, each group extending in different directions and cooperating at one end to define separate faces and all groups cooperating at an opposite end to define a single face.

---

This application is a division of applicant's copending application Ser. No. 57,045, filed Sept. 19, 1960, now Patent No. 3,247,755.

The field of this invention is that of display devices, and the invention relates, more particularly, to a novel and improved device and method of making a device for transmitting a plurality of image or display segments from more than one source to produce a composite or additive image or display.

Certain fiber optical image-transmitting or display devices such as kinescope viewing screens embody a multiplicity of light-conducting fibers each of which has a light-insulating coating, the fibers being assembled in side-by-side bundled relation so that corresponding ends of the fibers cooperate to define image-forming faces. In this construction, where the fibers occupy corresponding positions within the faces at each end of the bundle and therefore form what is called a coherent fiber bundle, light from each portion of a light image projected upon one bundle face can be received within and transmitted through respective fibers to be projected from the other bundle face for forming a corresponding mosaic light image on the other face. Light is transmitted through individual fibers in accordance with the well-known principles of internal reflection, the fiber coatings preventing optical interaction between adjacent fibers.

It has recently been proposed that such a construction can be utilized for transmitting partial monochromatic light images from several sources to produce a composite or additive multicolor picture or image. For example, groups of fibers can be assembled at one end in side-by-side bundled relation for forming a series of separate image-receiving faces and the opposite ends of the fibers can be combined in side-by-side bundled relation for forming a single image-viewing face. Each fiber group preferably comprises what can be called a coherent fiber bundle in that each fiber within a group occupies a position within the single image-viewing face which corresponds to its position within a separate image-receiving face. Partial monochromatic light images in the primary colors red, green and blue, for example, can then be directed upon respective image-receiving faces to be transmitted through the fibers by internal reflection to produce a composite multicolor mosaic image upon the single image-viewing face. Areas of the transmitted monochromatic light images can overlap in the single image-viewing face where necessary, so that if the fibers are of relatively small size, differently colored light projected from the fibers in the areas of image overlap can blend by light diffusion to produce the various additive or secondary colors which might form part of the composite image appearing on the single image-viewing face.

Where the fibers extending between image-receiving and image-viewing faces in such a device are not secured together throughout their length in constituent bundles, the image-transmitting device is easily damaged in that the individual fibers are likely to be broken during assembly or use. Further, unless formed in constituent bundles, the fibers are extremely difficult to position within the respective faces of the device. However, any constituent bundles formed of fibers extending between the image-receiving and image-viewing faces of the device must comprise coherent fiber bundles in which each bundle fiber occupies a corresponding position at each end of the bundle. Such coherent bundles tend to be of excessive length in order to permit separation of the bundles defining the single image-viewing face for forming the separate image-receiving faces and therefore tend to form a device of excessive bulk and weight.

It is an object of this invention to provide a novel and improved image-transmitting device which is adapted to transmit partial images from more than one source to produce a single composite or additive image or display: to provide such a device which is of compact size, lightweight, and strong construction; to provide such a device in which each constituent part is positioned and aligned with suitable accuracy; and to provide such a device which is inexpensive to manufacture.

It is a further object of this invention to provide novel and improved methods of manufacturing a device of the character described; to provide such a method which is fast, convenient and inexpensive; to provide such a method by which a device of the character described can be accurately manufactured; and to provide such a method of manufacture which is adapted to be carried out, at least to a limited extent, by machines.

Briefly described, the image-transmitting device provided by this invention comprises a multiplicity of light-transmitting fibers which are arranged in a plurality of groups at one end, the fibers in each group being horizontally and vertically arranged in side-by-side relation at said one end so that the fiber ends in each group cooperate to define a separate face. Those fibers which define successive transverse strips of said faces are secured together throughout their length for forming flat ribbons and the ribbons are arranged in layer relation at their opposite ends to define a single face. Preferably the opposite ends of ribbons from each group are interleaved in sequence in defining the single face so that each ribbon fiber occupies a position within the single face which corresponds to its position within the separate face defined by the fiber group of which it is a part.

In a preferred embodiment of this invention, the device comprises a multiplicity of light-transmitting fibers each of which has a light-insulating coating. The fibers are arranged in a plurality of groups at one end and the fibers are horizontally and vertically arranged in side-by-side relation in said groups so that the fibers in each group cooperate at said end to define a separate face. Those fibers which form successive transverse strips of said faces are secured together throughout their length for forming flat ribbons. The ribbons extend from respective separate faces in different directions within substantially parallel planes and converge at their opposite ends in interleaved relation, ribbons extending from the various separate faces being interleaved in sequence so that each ribbon fiber occupies a position within the single face which corresponds to its position within its respective separate face. For example, in a practical embodiment of this invention, the ribbons extending from some of the separate faces, at least, could extend obliquely from the faces in order to permit converging of the ribbons in parallel planes to define the single face. In an alternative embodiment of the invention, the ribbons extending from some of the separate faces, at least, could be curved in different directions within parallel planes in order to permit converging of the ribbons to define a single face, the fibers forming each of the curved ribbons being nested together with corresponding curvature so that each ribbon fiber maintains a constant relative position within its respective ribbon.

According to this invention, the methods of manufacturing an image-transmitting device of the character described includes as steps the providing of a multiplicity of light-transmitting fibers. The method further includes the steps of winding each fiber in the form of a helix, securing adjacent convolutions of each helix together, and cutting each helix transversely of the helix convolutions in at least one location for forming at least one flat ribbon in which a fiber length from each helix convolution extends from end to end of the ribbon. The method further includes the step of arranging the ribbons in layer relations so that the ribbons cooperate at one end to define a single face and cooperate at the opposite end to define more than one face. In a practical method provided by this invention, the flat ribbons are arranged in layer relation in groups so that the ribbons in each group cooperate at one end to define a separate face, and the ribbons from each group are interleaved in sequence at their opposite ends for defining a single face, thereby to form an image transmitting device of the character described in which each ribbon fiber occupies a position within the single face corresponding to its position within its respective separate face.

In a preferred method provided by this invention, the method includes the step of providing a multiplicity of light-transmitting fibers each of which has a light-insulating coating. The method includes the further steps of winding each fiber in the form of a helix, securing adjacent convolutions of each helix together, and cutting the helices transversely of the helix convolutions for forming flat ribbons in which fiber lengths from the helix convolutions extend from end to end of the ribbons in side-by-side relation and in some of which, at least, the fibers extend from end to end of the ribbons in other than straight perpendicular lines. For example, in a practical method according to this invention, the fibers could be wound in the form of helices of constant diameters and some of the helices, at least, could be cut obliquely of the helix convolutions for forming flat ribbons in which the fibers extend in side-by-side parallel relation between the ribbon ends but extend obliquely from the ribbon ends. In an alternative method provided by this invention, the fibers could be wound in the form of helices, some of which at least taper from end to end. The helices can then be cut transversely of the helix convolutions for forming flat ribbons in which fiber lengths from the helix convolutions extend from end to end of the ribbons, the fibers in ribbons formed from said tapered helices being curved between the ends of the ribbon with the fibers being nested together with corresponding curvature within respective ribbons. The preferred method provided by this invention further includes the steps of arranging the ribbons in groups so that corresponding ribbon fibers in each group extend in the same direction and so that ribbon fibers in different groups extend in different directions, superimposing the ribbons in each group in layer relation so that the ribbons in each group cooperate at one end to define a separate face, disposing the ribbon groups so that the opposite ends of the ribbons extend in substantially parallel planes, and interleaving opposite ribbon ends from each group in sequence so that the opposite ribbon ends cooperate to define a single face.

Other objects, advantages, and details of the device and methods of making the device provided by this invention will appear in the following description of preferred embodiments of the device and preferred methods of manufacturing the device according to this invention, the description referring to the drawing in which:

FIG. 9 is a plan view of the image-transmitting device provided by this invention;

FIG. 10 is a front elevation view of the device of FIG. 9;

FIG. 11 is a plan view similar to FIG. 9 showing an alternate use of the device provided by this invention;

FIG. 12 is a perspective view of the device of FIG. 9;

FIG. 13 is a diagrammatic view similar to FIG. 4 illustrating a step in an alternative method of manufacturing the device provided by this invention;

FIG. 14 is a plan view of the device component produced by the method step shown in FIG. 13;

FIG. 15 is a plan view of an alternative embodiment of the image-transmitting device provided by this invention; and FIG. 16 is a front elevation view of the device of FIG. 15.

Figure 1:
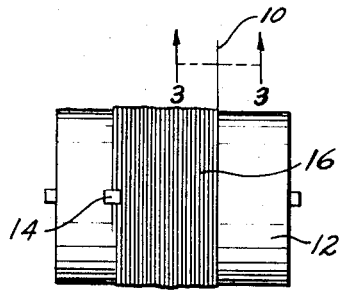
FIG. 1 is a diagrammatic view illustrating a step in the preferred method of manufacturing the device provided by this invention.
Figure 2:
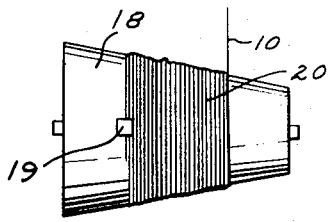
FIG. 2 is a diagrammatic view illustrating another step in the preferred method of manufacturing the device provided by this invention.
Figure 3:
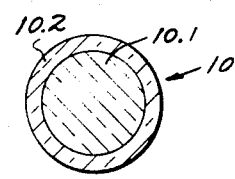
FIG. 3 is a section view along line 3—3 of FIG. 1.

Referring to the drawings, FIGS. 1–12 illustrate the preferred method of manufacturing the image-transmitting device provided by this invention. The preferred method includes the step of providing a multiplicity of light-transmitting fiber 10 each of which preferably comprises a light-transmitting core 10.1 and a light-insulating coating 10.2 as shown in FIG. 3. Each fiber core preferably comprises a glass material such as flint glass having a relatively high index of refraction and has a coating of glass material such as crown glass having a relatively low index of refraction, the fiber having a smooth reflective interface between the core and coating so that the fiber is adapted to transmit light from end to end thereof by means of total internal reflection of the light within the core in accordance with well-known principles. Preferably the fibers are approximately 25 to 50 microns in diameter for a purpose to be described below. It should be understood that although the fibers are preferably formed as described, the fibers could have additional coatings for other purposes or could be formed of other materials within the scope of this invention.

According to the invention, each fiber is wound in the form of a helix in which the helix convolutions are located closely adjacent to or in direct contact with each other. For example, as shown in FIG. 1, a fiber can be taped to a cylindrical mandrel 12 as at 14 and can be wound thereon in conventional manner to form a helix 16 of constant diameter. Also, as shown in FIG. 2, a fiber can be taped to a frustoconical mandrel 18 as at 19 and can be wound thereon to form a helix 20 which tapers from end to end. Thereafter, the convolutions of each helix are secured together as shown in FIGS. 4 and 5.

Figure 4:
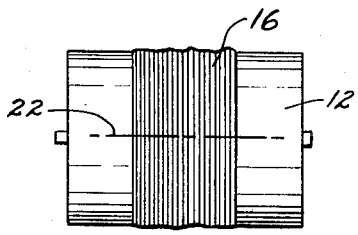
FIGS. 4 and 5 are diagrammatic views illustrating subsequent steps in the method of device manufacture shown in FIGS. 1 and 2 respectively.
Figure 5:
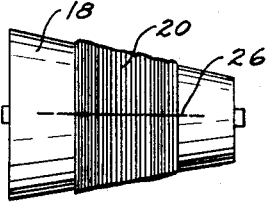
Figure 6:
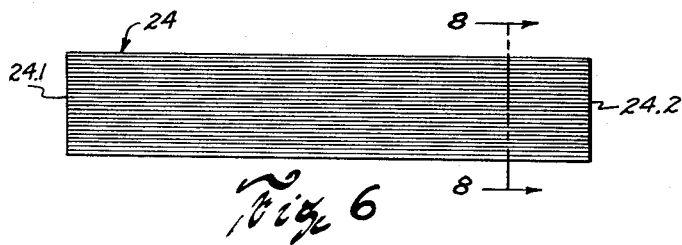
FIGS. 6 and 7 are plan views of the device components produced by the method steps shown in FIGS. 4 and 5 respectively.
Figure 7:
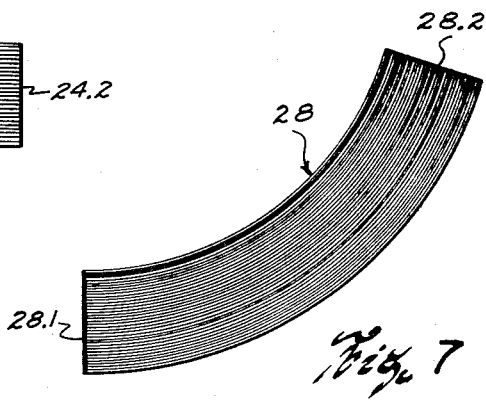
Figure 8:
FIG. 8 is a section view along line 8—8 of FIG. 6.

As shown in FIGS. 4, 5 and 8, the lengths of fibers 10 forming the helix convolutions are preferably adhered together with a suitable cement such as an epoxy resin. Alternatively, the fiber lengths forming the helix convolutions could be fused together or secured together in any other suitable manner.

Then the helices are cut in at least one location transversely of the helix convolutions for example by use of shears or a diamond cutting wheel in a conventional manner, thereby to form at least one flat ribbon from each helix in which fiber lengths from each helix convolution extend from end to end of the ribbon. For example, as shown in FIG. 4, the helix 16 can be cut parallel to the longitudinal axis of the helix along the line 22 for forming the straight, flat ribbon 24 shown in FIG. 6 in which fiber lengths from each helix convolution extend in parallel side-by-side relation between the ribbon ends 24.1 and 24.2. If desired, the helices can be cut in more than one location transversely of the helix convolution for forming more than one ribbon of relatively shorter length. Similarly, as shown in FIG. 5, the tapered helix 20 can be cut along the line 26 for forming the curved flat ribbon 28 shown in FIG. 7 in which fiber lengths extend curvilinearly between the ribbon ends 28.1 and 28.2, each fiber length in a ribbon being disposed in side-by-side nested relation to the other fiber lengths therein so that each fiber length occupies a constant relative position within its respective ribbon from end to end thereof. As can be readily understood, the apex angle and radius of the mandrel 18 can be selected to provide a ribbon 28 of the desired size and curvature.

Thereafter the ribbons 24 and 28 are disposed in groups according to their respective configuration, the ribbons in each group having corresponding fibers extending in the same direction between ends of the ribbons. Thus, the curved but flat ribbons 28 could be arranged in two separate groups $a$ and $b$ as shown in FIGS. 9-12 with the ribbon fibers extending from the ribbon ends 28.1 in different directions. Similarly, the flat straight ribbons 24 could be arranged in group. $c$. The ribbons within each group are arranged in layer relation so that the ends 28.2 and 24.2 of the ribbons cooperate within each group to define separate image-receiving faces 30a, 30b and 30c, respectively. As illustrated in FIGS. 9-12, these faces are defined by ribbon ends 28.2 and 24.2 which are preferably spaced a short distance apart within the faces, and preferably are held in spaced relation by strips 31 of metal, glass or other suitable material as shown in FIGS. 9 and 10, but as will be readily understood the ribbons defining each face could be moved into contact and could be adhered together with a suitable cement or could be fused together to form solid image-receiving faces. Of course, although each ribbon group is shown to include only four ribbons, many more ribbons would ordinarily be used in the device for providing image-receiving and viewing faces of any desired size.

At the other ends of the ribbons 28.1 and 24.1, the ribbons extend in substantially parallel planes, ribbons from each of the ribbon groups $a$, $b$ and $c$ converging together and being interleaved in sequence for defining a single image-viewing face 32. The ribbon ends 28.1 and 24.1 can be adhered together with a suitable cement or can be fused together, if desired, for forming a solid image-viewing face. Thereafter, the image-receiving and image-viewing faces can be ground and polished in conventional manner to provide optically finished surfaces at the ends of each of the fiber lengths embodied in the ribbons 24 and 28 to provide the device 29 shown in FIGS. 9-12. As will be understood, the configuration of the ribbons 24 and 28 can be selected to permit convergence of the ribbons at the ends 24.1 and 28.1 to define the single face 32 and to permit separation of the ribbons at the ends 24.2 and 28.2 to define the separate faces 30a, 30b, and 30c while maintaining the ribbons in substantially parallel planes. The helices similarly are wound to a selected length so that ribbons formed from the helices are adapted to extend the full width of the image-receiving and viewing faces. The spacer strips 31 preferably disposed between the ribbon ends defining the faces 30a, 30b and 30c are adapted to limit said faces to the same height and width as the face 32 so that there will be no magnification or distortion of image portions transmitted between said faces as described below. It will also be noted that the ribbon configuration can be selected so that two groups of ribbons, or more than the illustrated three groups of ribbons, may be provided in the image-transmitting device of this invention in accordance with the number of separate image-receiving faces which may be desired.

In this construction, the fibers 10 forming the ribbons 24 and 28 are easily arranged with great accuracy so that each group of ribbons can be said to comprise a coherent fiber bundle. That is, each fiber within a group $a$, $b$ or $c$ has a constant relative position within its group throughout its length so that the end 28.2 of the fiber occupies a position within a face 30a, 30b or 30c which corresponds to the position of the opposite end 28.1 of the fiber within the face 32. Accordingly, the fibers defining the image-receiving faces are adapted to receive and transmit light from respective portions of partial monochromatic images directed upon said faces for reproducing the image portions upon the device face 32 to form a composite, multicolor, mosaic image thereon. For example, cathode ray tubes 34a, 34b and 34c having phosphors which emit radiation in the primary colors red, green and blue respectively can be adapted to display partial monochromatic images upon the faceplates 35 of the tubes in conventional manner and can be mounted in close proximity to respective image-receiving faces of the device 29 of this invention. Preferably the tube faceplates 35 comprise fiber optical faceplates of conventional design which are adapted to display the images produced by the tubes directly upon the image-receiving faces of the device of this invention without distortions due to parallax and the like such as might occur where other than fiber optical faceplates were utilized. In this construction, the fibers in each of the image-receiving faces are adapted to receive and transmit light from respective portions of differently colored, partial, tube images for forming a composite multicolor image upon the device face 32. Alternatively, where conventional cathode ray tubes 34d, 34e and 34f, which do not have fiber optical faceplates are utilized as shown in FIG. 11, a lens 37 or other suitable optical system can be associated with each of these cathode ray tubes 34d, 34e and 34f for projecting the partial images displayed by said tubes upon respective image-receiving faces of the device 29 of this invention.

The partial images displayed by the cathode ray tubes can be reproduced in discrete form on the viewing face to provide a three-color image thereon in which there are sharp lines of demarcation between the various colored areas of the image. Preferably, however, the partial monochromatic images are adapted to overlap where necessary when projected from the viewing face 32 so that light of different colors can blend as a result of light diffusion with the areas of image overlap to produce the secondary or additive colors which may form part of the composite image. Where the fibers 10 are of small diameter, the composite image will be formed with good resolution and contrast.

An alternative method for manufacturing the device provided by this invention is illustrated in FIGS. 13-16. In this method as in the method above described, there is provided a multiplicity of fibers 10 each of which is wound upon a mandrel 12 in the form of a helix 16 of constant diameter as described above with reference to FIG. 1. Then, the fiber lengths forming the helix convolutions are cemented or otherwise secured together as described above with reference to FIG. 4. Some of the helices are cut transversely of the helix convolutions along the line 22 parallel to the longitudinal axes of the helices as shown in FIG. 4, thereby to form a number of ribbons 24. However, the remaining helices are cut obliquely across the helix convolutions, as indicated by the line 36 shown in FIG. 13, thereby to form a flat straight ribbon 38 as shown in FIG. 14. The fiber lengths forming the helix convolutions in the ribbons 38 then extend in side-by-side parallel relation between the ends 38.1 and 38.2 of the ribbons but extend obliquely from the ends of the ribbons.

The ribbons 24 and 38 are then disposed in groups according to their respective configuration, the ribbons in each group having corresponding fibers extending in the same direction between the ends of the ribbons. Thus, the ribbons 38 can be arranged in separate groups $d$ and $e$ as shown in FIGS. 15 and 16 with the ribbon fibers extending from the ribbon ends 38.1 in different directions. Similarly, the flat straight ribbons 24 can be arranged in group $f$. As in the method described above with reference to FIGS. 1–12, the ribbons within each group are arranged in layer relation so that the ends 38.2 and 24.2 cooperate within each group to define an image-receiving face 40$d$, 40$e$ and 40$f$ respectively. At the other ends of ribbons, the ribbons extend in substantially parallel planes, ribbons from each of the groups $d$, $e$ and $f$ converging together and being interleaved in sequence for defining a single image-viewing face 42. As noted above, with reference to FIGS. 1–12, the configuration of the ribbons 24 and 38 can be selected to permit convergence of the ribbons at the ends 24.1 and 38.1 to define the single face 42 and to permit separation of the ribbons at the ends 24.2 and 38.2 to define the separate faces 40$d$, 40$e$ and 40$f$ while maintaining the ribbons in substantially parallel planes. Where the ribbons 24 and 38 embody light-transmitting fibers 10 as described which are adapted to transmit light from end to end by internal reflection, the fibers in the ribbons 38 should not extend between the ribbon ends 38.1 and 38.2 at an angle A which exceeds the angle of light acceptance of said fibers. That is, as is well known by persons skilled in the use of light-transmitting fibers of the character described, a substantial part of the light entering the fiber cores 10.1 at very sharp angles will pass through the fiber coatings 10.2 without being reflected from the interfaces between the fiber cores and coatings. Such light is lost and is not transmitted through the fibers. Accordingly the fibers embodied in the ribbons 38 cannot extend obliquely from the faces defined by the ribbon ends 38.2 at angles which are greater than the angles at which said fibers are adapted to receive and transmit light from light images projected upon said faces. Preferably, the fibers embodied in the ribbons 38 extend from said faces at relatively small angles so that said fibers are adapted to receive and transmit a large part of the light projected upon said faces in forming light images thereon.

Having described my invention, I claim:

1. A method of making an image-transmitting device of the character described, said method comprising as steps: providing a plurality of light-transmitting fibers each of which has a light-insulating coating; winding the fibers in the form of helices, some of which at least taper from end to end; securing adjacent convolutions of each helix together; cutting the helices transversely of the helix convolutions so that the helices form flat ribbons in which fiber lengths from the helix convolutions extend from end to end of the ribbons and so that the fibers in ribbons formed from tapered helices are curved between the ends of said ribbons; arranging the ribbons in groups so that corresponding ribbon fibers in each group extend in the same direction and so that ribbon fibers in different groups extend in different directions; superimposing the ribbons in each group in layers so that the ribbons in each group cooperate at one end to define a separate face; disposing the ribbon groups so that the opposite ends of the ribbons extend in substantially parallel planes; and interleaving ribbon layers from respective groups in sequence at said opposite ends so that said opposite ribbon ends cooperate to define a single face in which the position of each ribbon fiber corresponds to its position within one of said separate faces.

2. A method of making an image-transmitting device of the character described, said method comprising as steps: providing a plurality of light-transmitting fibers each of which has a light-insulating coating; providing mandrel means; winding the fibers individually on the mandrel means in the form of helices at least two groups of which taper from end to end at respective angles; securing adjacent convolutions of each helix together; cutting the helices transversely of the helix convolutions so that the helices form flat ribbons in which fiber lengths from the helix convolutions extend from end to end of the ribbons and so that the fibers in ribbons formed from said tapered helices are curved between the ends of said ribbons at different radii; arranging the ribbons in groups so that corresponding ribbon fibers in each group extend in the same direction and so that ribbon fibers in different groups extend in different directions; superimposing the ribbons in each group in layers so that the ribbons in each group cooperate at one end to define a separate face; disposing the ribbon groups so that the opposite ends of the ribbons extend in substantially parallel planes; interleaving ribbon layers from respective groups in sequence at said opposite ends so that said opposite ribbon ends cooperate to define a single face in which the position of each ribbon fiber corresponds to its position within one of said separate faces; and securing said ribbons together at each of said faces.

3. A method of making an image-transmitting device component of the character described, said method comprising as steps: providing a light-transmitting fiber having a light-insulating coating; providing mandrel means; winding the fiber on the mandrel means in the form of a helix which tapers from end to end; securing adjacent convolutions of the helix together; and cutting the helix transversely of the helix convolutions for forming a flat ribbon in which fiber lengths from each helix convolution extend from end to end of the ribbon and in which each ribbon fiber curves between the ribbon ends to a corresponding extent.

References Cited

UNITED STATES PATENTS

| | | | |
|---|---|---|---|
| 2,943,968 | 7/1960 | Freeman et al. | 350—96 |
| 2,967,248 | 1/1961 | Nicoll | 350—96 |
| 3,043,910 | 7/1962 | Hicks | 350—96 |
| 3,104,191 | 9/1963 | Hicks et al. | 156—174 |

EARL M. BERGERT, Primary Examiner

M. E. McCAMISH, Assistant Examiner

U.S. Cl. X.R.

156—296; 350—96